July 30, 1957    H. P. HINTZ ET AL    2,800,832
FILM THREADING DEVICE FOR PHOTOGRAPHIC APPARATUS
Filed April 24, 1953
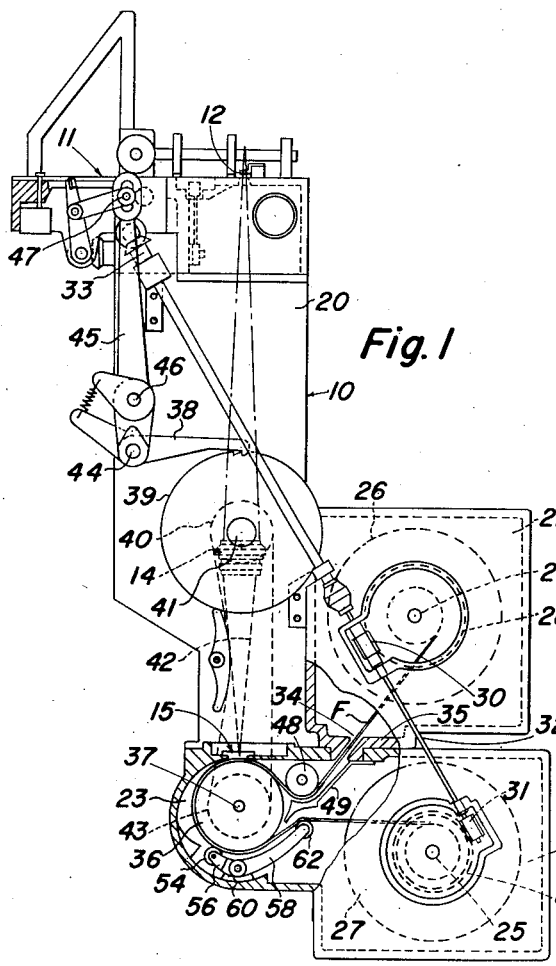
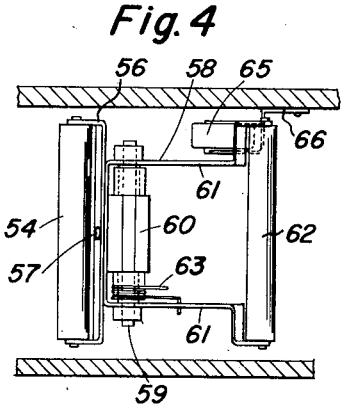
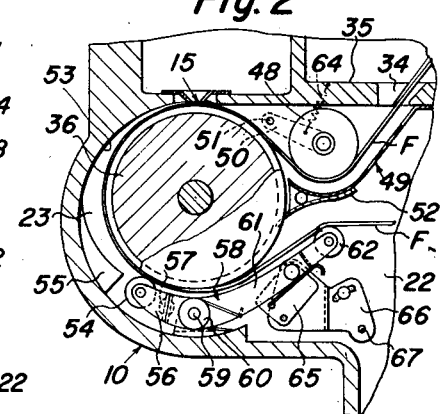
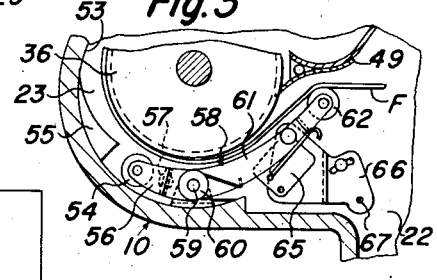
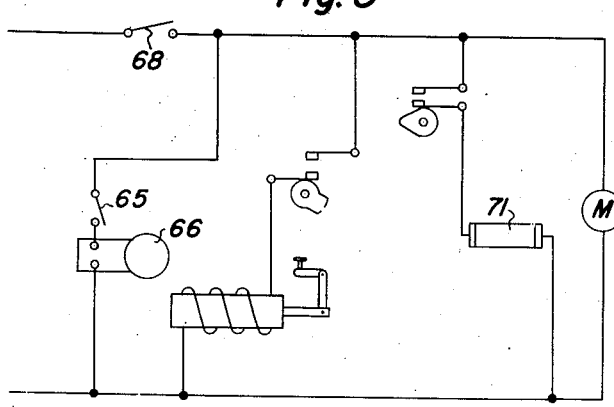
HARVEY P. HINTZ
JAMES F. HAYDEN
GLEN W. OFFENSEND
INVENTORS
BY
ATTORNEY & AGENT United States Patent Office 2,800,832
Patented July 30, 1957

2,800,832
FILM THREADING DEVICE FOR PHOTOGRAPHIC APPARATUS

Harvey P. Hintz, James F. Hayden, and Glen W. Offensend, Rochester, N. Y., assignors to Eastman Kodak Company, Rochester, N. Y., a corporation of New Jersey Application April 24, 1953, Serial No. 350,984

2 Claims. (Cl. 88—18)

This invention relates to photographic apparatus and more particularly to a device for automatically guiding and directing or threading a film strip about the film advancing means and upon movement of the film strip serving to maintain the film strip in engagement with the film advancing means.

It is well-known in the photographic field, particularly with regard to motion picture cameras and projectors to provide a series of guides or channels for threading a film strip about the advancing means and past the exposure or projection station. However, in such instances the film strip must be retained in a loop because of the intermittent feeding. In applications where the film strip is fed continuously and a friction drive is utilized for moving the film strip, such loops are dispensed with and it is necessary that the film strip be constantly under tension to provide uniform movement thereof.

In the present invention, the casing together with the film advancing means and a pair of spaced rollers mounted adjacent said advancing means provides in one position of the rollers a guide for threading the film strip into the take-up chamber and in the other position by virtue of the film tension serves to maintain the film strip in engagement with the film advancing means. Also upon failure of the film tension because of deletion of the supply or a break in the film strip, an indicating or warning device is actuated.

The primary object of the invention is, therefore, to provide in a photographic apparatus means for automatically threading a film strip about an advancing means and which, upon movement of the film strip and the tension thereof, will maintain the film strip in intimate engagement with said advancing means.

Another object of the invention is to provide in a photographic apparatus a pair of spaced rollers which are pivotally mounted for movement into an inoperative position for threading the film strip into the take-up chamber and movable by the tension of the film strip on one of the rollers into an operative position whereby the other roller engages the film strip to maintain it in engagement with the film advancing means.

And yet another object of the invention is to provide in a photographic apparatus a pair of spaced rollers which are pivotally mounted for movement between an inoperative and operative position and which in the inoperative position actuate an indicating or warning device.

These and other objects and advantages will be apparent to those skilled in the art by the description which follows.

Reference is now made to the accompanying drawing wherein like reference characters designate like parts and wherein:

Fig. 1 is a side elevation partially in section of a photographic apparatus embodying the invention;

Fig. 2 is an enlarged vertical sectional view of a portion of Fig. 1 showing in detail the elements forming the automatic threading device for the film strip in the operative or film-engaging position;

Fig. 3 is a sectional view substantially the same as that of Fig. 2 and showing the film engaging rollers in the inoperative or film-threading position;

Fig. 4 is a plan view of the spaced and pivotally mounted rollers within the exposure chamber; and Fig. 5 is a simplified wiring diagram showing the indicating or warning device actuated by the rollers in their inoperative position.

A preferred embodiment of the invention is disclosed in conjunction with photographic apparatus which feeds successively the cards from the bottom of a stack positioned in a feeding station into a photographing station in which a predetermined area on the card is aligned with an aperture and imaged in an exposure station. Such an apparatus is fully described in our copending application Serial No. 326,938, filed December 19, 1952, now Patent No. 2,738,704. Accordingly, only a brief description of the apparatus is deemed to be necessary in the present application.

The photographic apparatus comprising a casing or frame 10 on which is mounted a document feeding means 11 for moving the document into photographing station 12, which is spaced from the feeding station, and then into a suitable receptacle not shown. A projection lens 14 is mounted on casing 10 between photographing station 12 and exposure station 15 and images the area of each document in said exposure station through which the film strip F is moved.

Casing 10 comprises a vertical portion 20 which supports feeding means 11 and photographing station 12, a chamber 21 in which the supply of film is contained, a chamber 22 in which the take-up reel is housed and an exposure chamber 23 which is coextensive with the take-up chamber. As is well-known in the art, each of chambers 21 and 22 is provided with spindles 24 and 25 on which reels 26 and 27 are mounted, respectively. Spindles 24 and 25 are rotated through tendency drives, not shown, by means of worm wheels 28 and 29 which are driven by worm gears 30 and 31, respectively, secured to the common drive shaft 32 which, in turn, is rotated through bevel gear 33 in a manner more fully described in our above-mentioned application. To permit movement of film strip F from chamber 21 to chamber 22 an aperture 34 is provided in wall 35 therebetween.

The advancing means for the film strip F comprises a rotatable member or film drive roll 36 which is mounted on shaft 37 in exposure chamber 23 and intermittently driven by means of pawl 38 and ratchet 39 through sprocket 40 on ratchet shaft 41, chain 42, and sprocket 43 on shaft 37. Pawl 38 is pivotally mounted at 44 to one end of lever 45 which is pivotally mounted at 46 on casing 10. The other end of lever 45 is connected at 47 to an eccentric and oscillated in timed relation to the document feeding means as set forth in our aforementioned application. Film strip F is, therefore, intermittently advanced from supply reel 26 to take-up reel 27 by film drive roll 36.

A guide means for directing and moving the film strip introduced from chamber 21 through aperture 34 into exposure chamber 23 comprises a roller 48 and a guide plate 49 which are mounted adjacent aperture 34, as shown in Fig. 2. Roller 48 is rotatably mounted on arm 50 which is pivotally mounted at 51 on the casing and held in a position in which it is disengaged from film drive roll 36 by spring 64. When a film strip is to be threaded around roll 36, roller 48 is moved into and held in engagement with roll 36 which is rotated by its ratchet drive thereby imparting rotation to roller 48. The curved portion 52 of plate 49 serves to direct the leading end of the film strip inserted in aperture 34 toward the bite of film drive roll 36 and roller 48, and as long as the roll 36 and roller 48 are in engagement, the film strip will be driven toward the take-up chamber. The periphery of roll 36 together with the inner surface 53 of the exposure chamber wall forms a guideway for directing said end toward a roller 54. Fins or baffles 55 are integral with casing 10 and also serve to direct the end of the film strip toward roller 54.

Roller 54 is rotatably mounted in U-shaped bracket 56 which is pivotally mounted at 57 to a second U-shaped bracket 58 pivotally mounted at 59 in bearing member 60. By pivotally mounting roller 54 intermediate its ends, it automatically adjusts itself axially with respect to roller 36. The extending arms 61 of bracket 58 also carry a roller 62 which also engages the film strip, as shown in Figs. 1 and 2. In the operative or film-engaging position of rollers 54 and 62, as shown in Fig. 2, roller 54 is in engagement with the film strip on film drive roller 36 and is maintained in such position by reason of the tension of the film strip between film drive roller 36 and the convolutions of film on take-up reel 27 that is exerted on roller 62. As long as film is being advanced by roller 36 and such tension in the film strip continues to exist, roller 54 is maintained in said film-engaging position. The structure of bracket 56 and roller 54, as compared with bracket 58 and roller 62, is such that upon loss of film tension or breakage of the film strip, the spring 63 causes roller 54 to move away from roller 36. As a result, the rollers assume an inoperative or film-threading position in which roller 54 is displaced from the roller 36, as shown in Fig. 3. However, in this film-threading position, roller 54, the arms 61 of bracket 58 and roller 62 serve to direct the end of the film strip around the lower portion of roller 36 and into take-up chamber 22 where the free end can be secured to the hub of take-up reel 27. Accordingly, the film engaging means, comprising the spaced and pivotally mounted rollers 54 and 62, serves in the film-threading position to direct the film strip about the film drive roller 36 and in the film-engaging position roller 54, by reason of the force exerted on roller 62 by the film tension, maintains the film strip in engagement with the film drive roller.

In order to warn the operator and indicate that the film strip has been broken or that the film tension has been lost for one reason or another, a normally-closed switch 65 is mounted on plate 66 which is adjustably mounted on the side wall of chamber 22 at 67. As shown in Fig. 5, switch 65 is connected in series with a buzzer 66, the switch and buzzer being connected across the lines. Switch 65 is positioned with respect to bracket 58 so that the bracket in the film-engaging position holds the switch open. Accordingly, as long as the film strip is being moved in a normal manner, the buzzer is not energized. However, upon movement of bracket 58 and roller 62 to the film-threading position, switch 65 is allowed to close and buzzer 66 is energized. Such a switch member may also be inserted in one of the lines in order to completely shut down the apparatus. The remainder of the circuit forms no part of the invention and is similar to the circuit disclosed in our above-mentioned application, 70 indicating the motor for driving the feeding means from which lever 45 and shaft 32 are driven and 71 indicating the lamp for illuminating the photographing station.

While the invention has been described with respect to a particular embodiment thereof, it is to be understood that other modifications and applications of the invention will be suggested and apparent to those skilled in the art and the scope of the invention is pointed out in the appended claims.

Having now particularly described our invention, what we desire to secure by Letters Patent of the United States and what we claim is:

1. In photographic apparatus, the combination with a casing having a supply chamber, an exposure chamber provided with an exposure aperture, and a take-up chamber coextensive with said exposure chamber and adjacent said supply chamber, said casing being provided with an aperture connecting said supply and exposure chambers, and a reel rotatably mounted within each of said supply and take-up chambers, of an intermittently rotatable member within said exposure chamber for advancing a film strip past said exposure aperture, the peripheral surface of said rotatable member and a wall of said exposure chamber providing a guideway for directing said film strip around said rotatable member, guide means positioned between said exposure and supply chambers and including a pivotal roller adapted to be moved into engagement with said rotatable member for directing and moving said film strip into said exposure chamber and through said guide way and to said take-up chamber, and film engaging means movable between film-threading and film-engaging positions and including a support member mounted within said exposure chamber and on the side of said rotatable member opposite said exposure aperture and having a roller rotatably mounted at each end of said support member, said support member being pivotally mounted so that the moment arms thereof with respect to the pivot point are unequal and said support member and rollers are normally maintained in said film-threading position for directing the film strip from said rotatable member toward the reel in said take-up chamber and movable into and maintained in said film-engaging position by the portion of said film strip between said rotatable member and the take-up reel and in engagement with one of said rollers whereby the other roller continuously engages and maintains the film strip in engagement with said rotatable member.

2. In photographic apparatus, the combination with a casing having a supply chamber, an exposure chamber provided with an exposure aperture, and a take-up chamber coextensive with said exposure chamber and adjacent said supply chamber, said casing being provided with an aperture connecting said supply and exposure chambers, and a reel rotatably mounted within each of said supply and take-up chambers, of an intermittent drive means including a rotatable member within said exposure chamber for advancing a film strip past said exposure aperture, the peripheral surface of said rotatable member and a wall of said exposure chamber providing a guideway for directing said film strip around said rotatable member, guide means positioned between said exposure and supply chambers and including a pivotal roller adapted to be moved into engagement with said rotatable member for directing and moving said film strip into said exposure chamber and through said guide way and to said take-up chamber, film engaging means movable between film-threading and film-engaging positions and including a support member mounted within said exposure chamber on the side of said rotatable member opposite said exposure aperture and having a roller rotatably mounted at each end of said support member, said support member being pivotally mounted so that the moment arms thereof with respect to the pivot point are unequal and said support members and rollers are normally maintained in said film-threading position for directing the film strip from said rotatable member toward the reel in said take-up chamber and movable into and maintained in said film-engaging position by the portion of said film strip between said rotatable member and the take-up reel and in engagement with one of said rollers whereby the other roller continuously engages and maintains the film strip in engagement with said rotatable member, and tell-tale means actuated by said film engaging means in said film-threading position for indicating loss of the tension in said film strip.

References Cited in the file of this patent

UNITED STATES PATENTS

| | | |
|---|---|---|
| 1,958,152 | Oehmichen | May 8, 1934 |
| 2,051,036 | Foster et al. | Aug. 18, 1936 |
| 2,142,493 | Carpenter | Jan. 3, 1939 |

FOREIGN PATENTS

| | | |
|---|---|---|
| 388,510 | Germany | Jan. 19, 1924 |